United States Patent [19]
Winiarski

[11] 3,808,980
[45] May 7, 1974

[54] CONVEYOR MECHANISM FOR WHEELED VEHICLE

[76] Inventor: Conrad M. Winiarski, 10851 Wellworth Ave., Los Angeles, Calif. 90024

[22] Filed: July 3, 1972

[21] Appl. No.: 268,510

[52] U.S. Cl.............. 104/167, 104/172 B, 198/213
[51] Int. Cl............................................. B61b 13/12
[58] Field of Search........................ 104/161, 172 B

[56] References Cited
UNITED STATES PATENTS
| | | | |
|---|---|---|---|
| 428,639 | 5/1890 | Siccardi | 104/167 |
| 1,298,285 | 3/1919 | Bogaty | 104/167 |

Primary Examiner—M. Henson Wood, Jr.
Assistant Examiner—Robert Saifer
Attorney, Agent, or Firm—Herzig & Walsh

[57] ABSTRACT

The invention is a conveyor or transfer means for wheeled vehicles. A helical member or worm is provided in a trough or channel extending in the direction that the vehicle is to be transferred or moved. One or more wheels of the vehicle directly engage a convolution of the helix or worm which is power driven to rotate about its axis so that the convolution of the helix exerts a driving thrust directly against the vehicle wheel to move or convey the vehicle.

8 Claims, 4 Drawing Figures

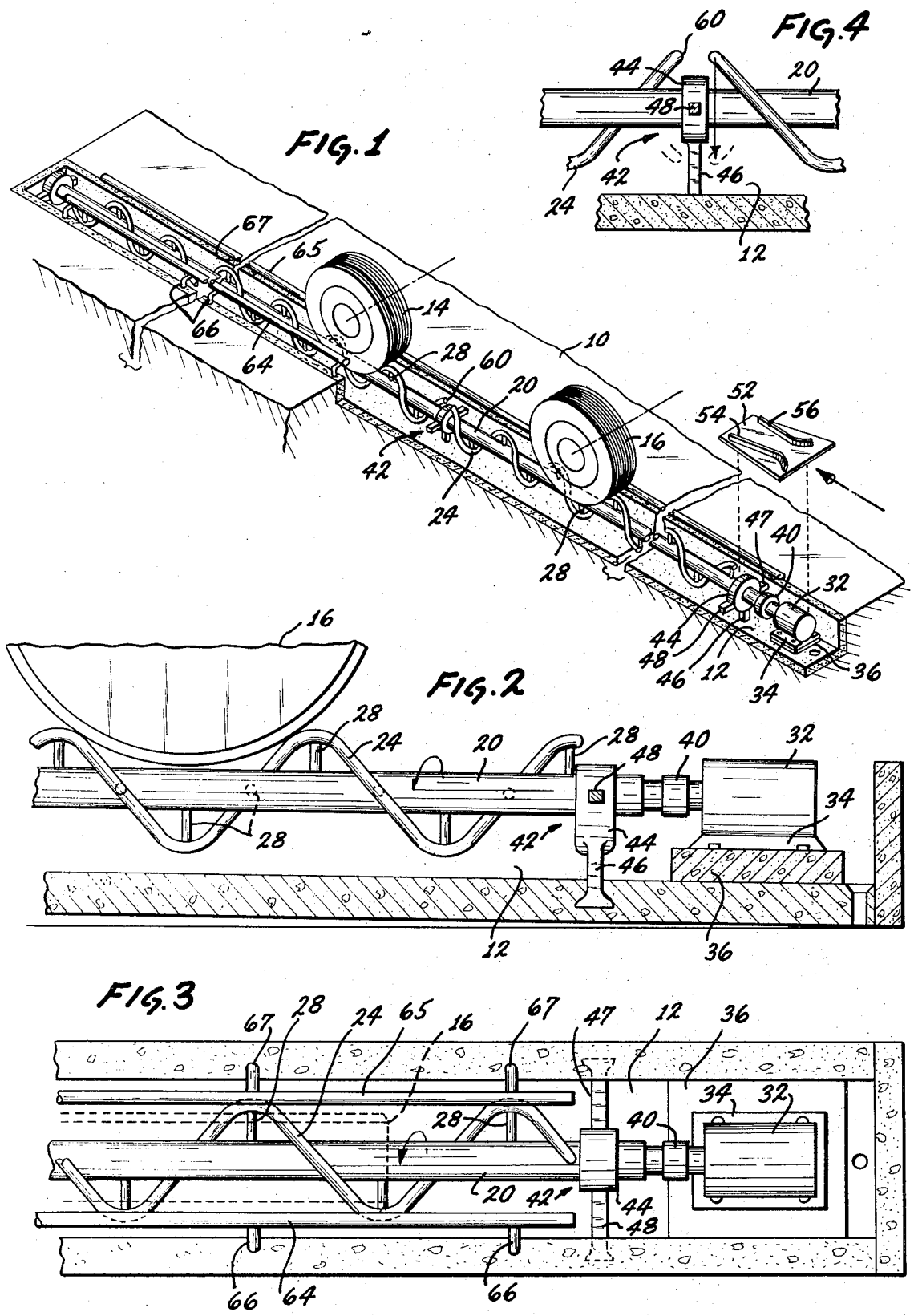

CONVEYOR MECHANISM FOR WHEELED VEHICLE

SUMMARY OF THE INVENTION

The invention is an apparatus or mechanism for transferring, moving, or conveying wheeled vehicles.

The invention is particularly adaptable for transferring or conveying automobiles as for example in a car wash or in an automobile service station.

With respect to the background of the invention, various types of conveyors or transfer means for vehicles are presently known in the art. A typical form of conveyor as presently known and used is in the form of an endless conveyor chain which has a hook or other means for attaching to the vehicle, such as to the vehicle bumper for moving or drawing the vehicle.

Another known type of conveyor utilizes an endless chain having a roller attached to it which can engage behind the vehicle wheel for moving the vehicle. These known types of transfer or conveyor means are extremely expensive and they involve many parts which are subject to wear and which require very substantial maintennace. Additionally, they require very substantial installation room.

Having reference to the herein invention, in a preferred form of it as described in detail herein, it is in the form of a power driven helix or worm which is so positioned and arranged that a vehicle wheel directly engages a convolution of the helix to be driven thereby. Preferably, a rigid member extends along the axis of the helix with the convolutions of the helix attached to it, the axial member being power driven from one end. The convolution of the helix which engages the vehicle wheel exerts a driving thrust against the wheel, moving the vehicle in the direction of the length of the helix.

The invention has for its purpose the realization of certain significant objectives. A primary objective is to provide a much simpler and less expensive mechanism, for transferring, moving, or conveying the vehicles. A further object is to provide an apparatus of this type having few moving parts, and further, parts which are easily maintained and which have a long, useful life and which are easy to replace in the event that repair or replacement is needed.

A further object is to provide an apparatus of this type embodying the quality or characteristic that in the event that repair is needed, repairs can be made very quickly and easily and thus, very appreciably reducing possible downtime or shutdown time of the installation having the transfer or conveying means as a part thereof. Factors such as these become important from an economic standpoint.

BRIEF DESCRIPTION OF THE DRAWINGS

Further objects and additional advantages of the invention will become apparent from the following detailed description and annexed drawings, wherein:

FIG. 1 is a perspective, partly schematic view, of a preferred form of the invention;

FIG. 2 is a partial, sectional side view of the form of the invention shown in FIG. 1;

FIG. 3 is a partial, sectional plan view of the form of the invention shown in FIGS. 1 and 2; and FIG. 4 is a detail view illustrating a pedestal support for the helix axis member.

DESCRIPTION OF THE PREFERRED EMBODIMENT

Referring to the drawings, FIG. 1 illustrates schematically and installation of the invention in a service station or car wash for example. Numeral 10 designates a part of the platform or runway along which vehicles are to be moved. At one side of the platform 10 is a trough member 12 which is U-shaped in cross section as shown and which may be constructed of any suitable material. For example, it might be made of metal or concrete. It is of a size to receive the helix or worm as will be described and to receive one or more wheels of a vehicle as designated schematically at 14 or 16.

In the preferred, exemplary form of the invention, there is provided an elongated, rigid rod member 20 which extends along the axis of the helix as shown. The helix itself is formed from a member as shown at 24 which is wound into helical form and positioned so that rigid member 20 extends along its axis. The elongated member has a size with respect to the helix such that the bottom of the wheel of a vehicle will substantially engage it. The rigid member and helix form what amounts to a worm, and the worm could be formed in various other ways or manners. The convolutions of helix 24 are attached or secured to rigid member 20 by radially extending members such as shown at 28, in FIG. 2.

Positioned at one end of rigid member 20 is a motor 32 having a base part 34 supported upon supporting block 36 in trough 12. The motor is coupled to the end of rigid member 20 by coupling 40. Motor 32 is of suitable power and speed to drive rigid member 20 and the helix at an appropriate speed for driving or transferring a vehicle as will be described.

The helix and rigid member 20 are supported by pedestal supports, one of which is designated at 42. Support 42 embodies a bearing 44 in which rigid member 20 is journalled. It has an upright part 46 upstanding from the bottom of trough 12 as may be seen in FIG. 2. It is braced by lateral brace members 47 and 48 as may be seen in FIG. 1. Pedestal support bearings like pedestal support 42 are provided at intervals, as necessary, along the length of helix 24 and rigid member 20, depending on the total length.

At the end of trough 12, preferably, there is provided at the upper side of it a platform or guide shoe 52 having guide ribs 54 and 56 as shown to guide the wheel of a vehicle passing between these ribs into a position directly over helix 24 and rigid member 20.

At the positions of pedestal support 42, interruptions are provided in helix 24 as designated at 60 in FIG. 4. As described, pedestal bearing support 42 is supported by a single upright 46. Helix 24 rotates about the axis of rigid member 20, and by reason of the interruptions as designated at 60, the helix is able to pass the vertical support uprights and horizontal supports 47 and 48 and uprights 46 of the pedestal support bearings.

FIGS. 1, 2, and 3 illustrate the operation of the apparatus. In these figures, one or more wheels of a vehicle are caused to enter trough 12 so that the wheels come into contact directly with helix 24. In other words, the helix engages directly against the wheel or the tire on the wheel of the vehicle so that as the helix is rotating, it exerts a forward thrust against the wheel by powered rotation. The wheels rotate about their axes as the vehicle is moved. The convolution of the helix engages the wheel such as to exert an increment of lateral thrust. Because of this, one or two guide rails as designated by 64 and 65 are provided supported by support members such as shown at 66 and 67. The guide rails guide the vehicle wheel or wheels preventing lateral movement and constraining the vehicle to move in the direction of the axis of the helix.

Those skilled in the art will readily understand and appreciate the manner in which the invention achieves and realizes the objects set forth in the foregoing.

The foregoing disclosure is representative of a preferred form of the invention and is to be interpreted in an illustrative rather than a limiting sense, the invention to be accorded the full scope of the claims appended hereto.

What is claimed is:

1. As an article of manufacture, a conveyor means for wheeled vehicles, comprising: means constituting an elongated helix forming a worm, said helix having a central axis; and drive means for rotating said helix about said axis, said helix and drive means being positioned whereby a supporting wheel of a vehicle directly engages with a part of a convolution of the helix which is rotating whereby the helix continuously imparts a component of thrusting force to the wheel for moving the vehicle.

2. Apparatus as in claim 1, including an elongated rigid member positioned along the axis of the helix which is driven by the drive means, said elongated member having a relative size with respect to the helix such that the bottom of said wheel substantially engages said member.

3. Apparatus as in claim 1, including a platform along which a vehicle is to be moved, said platform having a trough formed therein with said helix positioned in the trough whereby to receive at least one wheel of the vehicle.

4. Apparatus in claim 1, including pedestal bearing means supporting said elongated member.

5. Apparatus as in claim 4, including at least one pedestal bearing having a support upright, said helix being interrupted at the position of the upright to permit the helix when rotating to pass said upright.

6. Apparatus as in claim 2, wherein said helix is rigidly connected to said elongated member, at least one pedestal bearing having a support therefor, said helix being interrupted at the position of said support so that the helix when rotating can pass said upright which passes through the interrruption in the helix.

7. Apparatus as in claim 1, including guide rails positioned along side said helix whereby lateral restraint for the vehicle wheel is provided.

8. Apparatus as in claim 7, wherein said guide rails are positioned so that the vehicle wheel engages a guide rail at the same time as it is engaged by part of said helix.

* * * * *